(12) United States Patent
Lee et al.

(10) Patent No.: US 8,891,428 B2
(45) Date of Patent: Nov. 18, 2014

(54) STRUCTURE OF AN EFFICIENT RELAY MEDIUM ACCESS CONTROL PROTOCOL DATA UNIT IN A BROADBAND WIRELESS ACCESS SYSTEM, AND DATA TRANSMISSION METHOD USING SAME

(75) Inventors: Eun Jong Lee, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 13/392,491

(22) PCT Filed: Aug. 25, 2010

(86) PCT No.: PCT/KR2010/005715
§ 371 (c)(1),
(2), (4) Date: Mar. 21, 2012

(87) PCT Pub. No.: WO2011/025272
PCT Pub. Date: Mar. 3, 2011

(65) Prior Publication Data
US 2012/0188931 A1    Jul. 26, 2012

Related U.S. Application Data

(60) Provisional application No. 61/237,271, filed on Aug. 26, 2009, provisional application No. 61/242,374, filed on Sep. 14, 2009.

(30) Foreign Application Priority Data

Aug. 24, 2010    (KR) .................. 10-2010-0081905

(51) Int. Cl.
*H04B 7/155*    (2006.01)

(52) U.S. Cl.
CPC ..................................... *H04B 7/155* (2013.01)
USPC ....................................................... 370/312

(58) Field of Classification Search
CPC ............ H04B 7/14; H04B 7/15; H04B 7/155; H04B 7/185; H04B 7/204; H04B 7/212; H04B 7/2121; H04W 84/047; H04W 8/00; H04W 8/18; H04W 8/20; H04W 8/205; H04W 92/04; H04W 92/045; H04W 92/12
See application file for complete search history.

(56) References Cited

U.S. PATENT DOCUMENTS

2007/0072604 A1* 3/2007 Wang ............................ 455/428
2007/0280292 A1   12/2007 Lee et al.
2009/0310533 A1* 12/2009 Zheng et al. .................. 370/328
2010/0111061 A1* 5/2010 Zheng et al. .................. 370/338

FOREIGN PATENT DOCUMENTS

KR    1020080015214    2/2008

* cited by examiner

*Primary Examiner* — Chirag Shah
*Assistant Examiner* — Rina Pancholi
(74) *Attorney, Agent, or Firm* — Lee, Hong, Degerman, Kang & Waimey

(57) ABSTRACT

A broadband wireless access system including a relay station and a structure of a relay medium access control (MAC) protocol data unit (PDU) are disclosed. A method in which a base station (ABS) transmits data for a plurality of mobile stations (AMSs) to a relay station (ARS) in a broadband wireless access system includes generating second transmission unit data using a plurality of first transmission unit data oriented toward the plurality of mobile stations and using mobile station identifier information for indicating mobile stations to which each of the plurality of first transmission data unit data is to be transmitted and transmitting the second transmission unit data to the relay station.

6 Claims, 11 Drawing Sheets

STRUCTURE OF AN EFFICIENT RELAY MEDIUM ACCESS CONTROL PROTOCOL DATA UNIT IN A BROADBAND WIRELESS ACCESS SYSTEM, AND DATA TRANSMISSION METHOD USING SAME

CROSS-REFERENCE TO RELATED APPLICATIONS

This application is the National Stage filing under 35 U.S.C. 371 of International Application No. PCT/KR2010/005715, filed on Aug. 25, 2010, which claims the benefit of earlier filing date and right of priority to Korean Application No. 10-2010-0081905, filed on Aug. 24, 2010, and also claims the benefit of U.S. Provisional Application Ser. Nos. 61/242,374, filed on Sep. 14, 2009 and 61/237,271, filed on Aug. 26, 2009, the contents of which are all incorporated by reference herein in their entirety.

TECHNICAL FIELD

The present invention relates to a broadband wireless access system including a relay station, and more particularly, to a structure of a relay medium access control (MAC) protocol data unit (PDU) which can be used in data transmission between a base station and the relay station, a data transmission scheme using the structure, and an apparatus for performing the scheme.

BACKGROUND ART

Generally, the prospect of a relay station (RS) in a next generation wireless communication system is very encouraging. The concept of the relay station (RS) is schematically explained as follows.

First of all, IEEE (institute of electrical and electronics engineers) 802.16 continues to progress with a standardization project of a new subject called a multi-hop relay after publishing IEEE 802.16-2004 as a standard specification targeting a fixed subscriber mobile station and IEEE.16e-2005 as a standard specification to provide mobility of a subscriber mobile station.

This project, which is taken care of by Task Group j (IEEE 802.16j) in IEEE 802.16, starts full discussions on usage models, relevant terminologies and technical requirements in the $2^{nd}$ meeting in July 2006 since the $1^{st}$ official meeting in May 2006. In the following description, IEEE 802.16 task group will be abbreviated 802.16j.

The concept of a relay station, which will be explained in the following description, may be used as the substantially identical concept for a relay station currently considered by 3GPP LTE-A system. And, a relay station capable of performing a same or similar function in one of various wireless access systems may be usable for the concept similar to that of a relay station according to the present invention.

PAR (project authorization request) of 802.16j is the standardization task to progress in the future and intends to achieve two kinds of objects including coverage extension of a service area and throughput enhancement.

Relay stations can be primarily categorized into two types. There are a relay station of a transparent type and a relay station of a non-transparent type. The transparent relay station has all operations and functions exist therein to manage a mobile station, while the non-transparent relay station plays a role in relaying all operations and function between a macro base station and a mobile station via the macro base station.

In aspect of a mobile station, a transparent relay station and a non-transparent relay station are treated as a single macro base station to have no change of operations but the mobile station may have a function of identifying a relay station and a macro base station from each other.

A network including a relay station may include a base station (BS), a relay station (RS) and a mobile station (MS). Despite being located outside a cell area of the base station, the mobile station is able to receive a radio signal via the relay station. And, it may be able to set up a path of high quality, which has a high-level adaptive modulation and coding (AMC) scheme, for the mobile station located within the cell area of the base station via the relay station. Hence, a user is able to obtain such an effect as increasing overall system capacity with the same radio resource.

The standard specification prepared by the 802.16j project has prescribed requirements. For instance, a mobile station, which is implemented on the bases of the previous 902.16-2004 and 802.16e-2005 specifications, should be able to communicate with a base station without any additional function. Hence, in a previous system, an application rage of a relay station may be limited in a manner of adding partial functions of controlling a relay station to the relay station itself and a previous base station. And, it is expected that specifications for a relay station become a core matter of the future standardization.

A relay station can be regarded as a sort of a subscriber mobile station that performs operations of a physical layer and a medium access control layer. Although the relay station is mainly controlled by a base station, it may have a prescribed control function of itself if necessary. As currently discussed utility models, relay stations of various types (e.g., a fixed relay station, a mobile relay station to provide a temporary service for a specific area, a relay station installable at a vehicle, a subway and the like, etc.) are currently taken into consideration.

The representative technical issues, which will be discussed, can be summarized as follows.

1. Procedure for a base station to identify relay stations existing within its area and to obtain and maintain information on a topology of connection with the identified relay stations 2. Definition of a physical transmission frame between a mobile station having backward compatibility with a previous IEEE 802.16 system and a relay station 3. Signal procedure to provide mobility between relay stations or between a relay station and a base station 4. Procedure for network entry of a relay station into a base station and entry procedure of a mobile station via a relay station Meanwhile, a frame structure used by a relay station may include a downlink frame structure and an uplink frame structure. In particular, the downlink frame structure may include a downlink (DL) access zone and a downlink (DL) relay zone and the uplink frame structure may include an uplink (UL) access zone and an uplink (UL) relay zone.

In this case, if a single relay station exists between a base station and a mobile station (i.e., 1-hop structure), a DL access zone indicates an interval for a relay station (ARS) to transmit a data packet and the like to a mobile station (AMS) or another subordinate relay station and a UL access zone indicates an interval for a mobile station (AMS) or a subordinate relay station to transmit a data packet and the like to a corresponding relay station (ARS). In a DL relay zone, a relay station (ARS) is able to receive a data packet from a base station (ABS). In a UL relay zone, a relay station (ARS) is able to transmit a data packet to a base station (ABS).

A data packet may have a configuration of MAC PDU (medium access control protocol data unit). The MAC PDU is accompanied with a MAC header. Prior to the description of the MAC header, a protocol layer model defined in a general broadband wireless access system is described as follows.

FIG. 1 shows a protocol layer model defined in a wireless mobile communication system based on the generally used IEEE 802.16 system.

Referring to FIG. 1, a MAC layer belonging to a link layer may consist of 3 sublayers. First of all, a service-specific convergence sublayer (CS) is able to transform or map external network data received via a CS service access point (SAP) to MAC SDUs (service data units) of a MAC common part sublayer (CPS). In this layer, a function of discriminating SDUs of the external network and then linking a corresponding MAC service flow identifier (SFID) and a CID (connection identifier) to each other can be included.

The MAC CPS is the layer of providing such a core function of MAC as a system access, a bandwidth allocation, a connection establishment and management and the like and receives data classified by a specific MAC connection from various CSs via the MAC SAP. In doing so, QoS (quality of service) may be applied to data transmission via a physical layer and scheduling.

A security sublayer is able to provide an authentication function, a security key exchange function and an encryption function.

The MAC layer is a connection-oriented service and is implemented with a concept of transport connection. When a mobile station is registered to a system, a service flow can be provided by a negotiation between the mobile station and the system. If a service requirement is changed, a new connection can be established. In this case, the transport connection defines a mapping between peer convergence processes that use the MAC and the service flow and the service flow defines QoS parameters of MAC PDU exchanged in the corresponding connection.

The service flow on the transport connection plays a core role in managing a MAC protocol and provides mechanism for the QoS management of uplink and downlink. In particular, service flows can be combined with a bandwidth allocation process.

In a general IEEE 802.16 system, a mobile station can have a 48-bit universal MAC address at each radio interface. This address uniquely defines the radio interface of the mobile station and may be used to establish a connection of the mobile station in an initial ranging procedure. Since a base station verifies mobile stations with different identifiers (IDs) of the mobile stations, respectively, the universal MAC address may be used as a part of an authentication process.

Each connection can be identified by a connection identifier (CID) having a 16-bit length. While initialization of a mobile station is in progress, 2 pairs (e.g., UL & DL) of management connection are set between the mobile station and a base station and 3 pairs including the management connection can be optionally available. In a current IEEE 802.16m system, CID is replaced by a station identifier (STID) and a flow identifier (FID) for identifying a flow. In this case, the station identifier means a 12-bit identifier allocated to a mobile station performing a network entry (or network re-entry) by a base station and the flow identifier means a 4-bit identifier for identifying a connection (e.g., a management connection, a transport connection, etc.) for a specific mobile station. And, ARS STID can be assigned to an advanced relay station (ARS) of the IEEE 802.16m system.

In the above-described layer structure, a transmitting stage and a receiving stage may be able to exchange data or control messages via MAC PDU. In order to generate this MAC PDU, a base station or a mobile station may have a MAC header included in the MAC PDU.

In particular, the MA PDU may be able to include a MAC header, an extended header and a payload. The MAC header is always included in the MAC PDU, while the payload may be optionally included in the MAC PDU if necessary. Yet, the extended header is not included in the MAC PDU without the payload.

In the following description, a structure of a generic MAC header is explained with reference to FIG. 2.

FIG. 2 shows one example of a structure of a generic MAC header (GMH) or an advanced generic MAC header (AGMH) applied to IEEE 802.16m system.

Fields included in the MAC header shown in FIG. 2 are described as follows.

First of all, a flow identifier (Flow ID) field is ale to indicate a flow connection identifier of a generic MAC header. An extended header (EH) field indicates whether an extended header is accompanied behind the MAC header. A length field indicates a size of a payload accompanied behind MAC PDU or MAC header.

When data is transmitted using 2-byte GMH shown in FIG. 2, whether an extended header is accompanied can be indicated via the EH field and additional header information may be included via the extended header.

A relay station exchanges data with another relay station, a base station and/or a mobile station by a relay MAC PDU transmission and/or a MAC PDU transmission. In this case, in aspect of a relay station (ARS), the MAC PDU may mean a transmission unit including data transmitted to the relay station (ARS) and the relay MAC PDU may mean a transmission unit including data that the relay node should relay to another entity (e.g., data received from a base station and then relayed to a mobile station).

In doing so, the demands for a relay MAC PDU structure for a relay station, which relays data exchanged between a base station and a plurality of mobile stations, to perform more efficient data transmission on the base station and a data transmitting method using the same are rising.

DISCLOSURE OF THE INVENTION

Technical Tasks

Accordingly, the present invention is directed to substantially obviate one or more problems due to limitations and disadvantages of the related art. First of all, an object of the present invention is to provide a relay MAC PDU structure, by which data can be efficiently exchanged between a relay station and a base/mobile station.

Another object of the present invention is to provide a method and apparatus for efficiently exchanging data using the aforementioned efficient relay MAC PDU structure.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in a base station (ABS) of a broadband wireless access system, a method of transmitting data for a plurality of mobile stations (AMS) to a relay station (ARS)

according to one embodiment of the present invention may include the steps of generating a plurality of $1^{st}$ transmission unit data heading for a plurality of the mobile stations and $2^{nd}$ transmission unit data using a mobile station identifier information indicating the mobile station to which each of a plurality of the $1^{st}$ transmission unit data will be transmitted and transmitting the $2^{nd}$ transmission unit data to the relay station, wherein the $2^{nd}$ transmission unit data comprises a header having a connection identifier between the base station and the relay station and an extended header containing the mobile station identifier information.

Preferably, the $1^{st}$ transmission unit data may include a MAC PDU (medium access control protocol data unit) and wherein the $2^{nd}$ transmission unit data comprises a relay MAC PDU.

Preferably, the mobile station identifier information may include a number field indicating a number of a plurality of the $1^{st}$ transmission unit data and station identifier (STID) fields amounting to the number indicated by the number field.

Preferably, the mobile station identifier information may include field groups amounting to the number of a plurality of the $1^{st}$ transmission unit data included in the $2^{nd}$ transmission unit data and each of the field groups may include a station identifier (STID) field and a field indicating whether a different station identifier field is accompanied behind the station identifier field.

Preferably, the connection identifier may be set to a value indicating a tunnel connection established between the base station and the relay station.

To further achieve these and other advantages and in accordance with the purpose of the present invention, in a relay station (ARS) of a broadband wireless access system, a method of relaying data for a plurality of mobile stations (AMS) from a base station (ABS) to each of a plurality of the mobile stations according to another embodiment of the present invention may include the steps of receiving a plurality of $1^{st}$ transmission unit data heading for a plurality of the mobile stations and $2^{nd}$ transmission unit data containing mobile station identifier information indicating the mobile station to which each of a plurality of the $1^{st}$ transmission unit data will be transmitted from the base station and transmitting each of a plurality of the $1^{st}$ transmission unit data to the mobile station indicated by the mobile station identifier information, wherein the mobile station identifier information is contained as an extended header format in the $2^{nd}$ transmission unit data.

Preferably, the $1^{st}$ transmission unit data may include a MAC PDU (medium access control protocol data unit) and the $2^{nd}$ transmission unit data may include a relay MAC PDU.

Preferably, the mobile station identifier information may include a number field indicating a number of a plurality of the $1^{st}$ transmission unit data and station identifier (STID) fields amounting to the number indicated by the number field.

Preferably, the mobile station identifier information may include field groups amounting to the number of a plurality of the $1^{st}$ transmission unit data included in the $2^{nd}$ transmission unit data and each of the field groups may include a station identifier (STID) field and a field indicating whether a different station identifier field is accompanied behind the station identifier field.

Preferably, the $2^{nd}$ transmission unit data may include a connection identifier between the base station and the relay station and the connection identifier may be set to a value indicating a tunnel connection established between the base station and the relay station.

To further achieve these and other advantages and in accordance with the purpose of the present invention, a relay station (ARS) apparatus for relaying data exchanged between a base station (ABS) and a plurality of mobile stations (AMS) according to a further embodiment of the present invention may include a processor and a radio frequency (RF) communication module configured to transceive a radio signal externally under the control of the processor, wherein the processor acquires a plurality of $1^{st}$ transmission unit data heading for a plurality of the mobile stations and mobile station identifier information indicating the mobile station to which each of a plurality of the $1^{st}$ transmission unit data will be transmitted from $2^{nd}$ transmission unit data received from the base station and controls each of a plurality of the $1^{st}$ transmission unit data to be transmitted to the mobile station indicated by the mobile station identifier information and wherein the mobile station identifier information is contained as an extended header format in the $2^{nd}$ transmission unit data.

Preferably, the $1^{st}$ transmission unit data may include a MAC PDU (medium access control protocol data unit) and wherein the $2^{nd}$ transmission unit data comprises a relay MAC PDU.

Preferably, the mobile station identifier information may include a number field indicating a number of a plurality of the $1^{st}$ transmission unit data and station identifier (STID) fields amounting to the number indicated by the number field.

Preferably, the mobile station identifier information may include field groups amounting to the number of a plurality of the $1^{st}$ transmission unit data included in the $2^{nd}$ transmission unit data and each of the field groups may include a station identifier (STID) field and a field indicating whether a different station identifier field is accompanied behind the station identifier field.

Preferably, the $2^{nd}$ transmission unit data may include a connection identifier between the base station and the relay station and the connection identifier may be set to a value indicating a tunnel connection established between the base station and the relay station.

Advantageous Effects

Accordingly, the present invention may provide the following effects and/or advantages.

First of all, a relay station is able to efficiently identify a MAC PDU, which is transmitted from a base station, for a different mobile station using STID information of a relay MAC PDU according to the present invention.

Secondly, a length of MAC PDU for a plurality of mobile stations can be sufficiently indicated using a length field extended longer than that of a previous GMH in a relay MAC PDU according to the present invention.

Thirdly, as a relay PDU according to the present invention is applied, a relay station is able to efficiently identify a MAC PDU transmitted to the relay station itself and a relay MAC PDU for a relay from each other.

Effects obtainable from the present invention may be non-limited by the above mentioned effect. And, other unmentioned effects can be clearly understood from the following description by those having ordinary skill in the technical field to which the present invention pertains.

MODE FOR INVENTION

Figure 1:
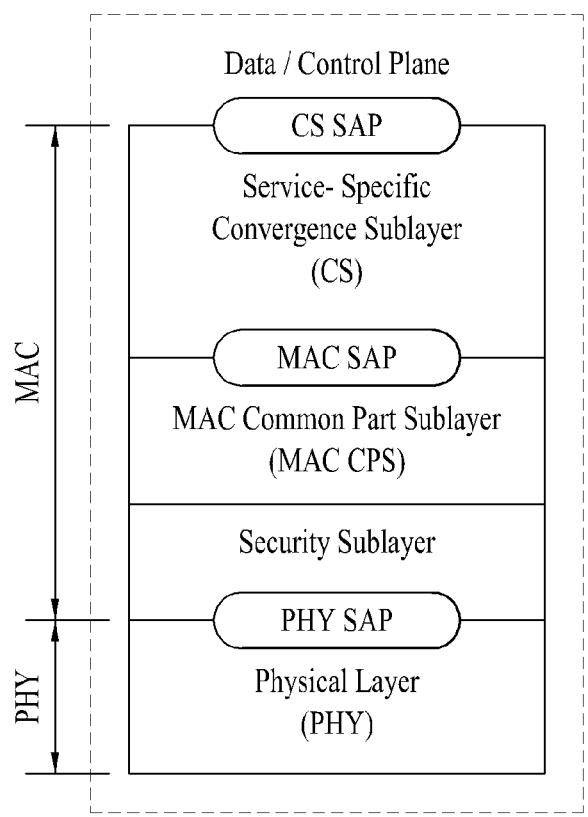
FIG. 1 shows a protocol layer model defined in a wireless mobile communication system based on the generally used IEEE 802.16 system.
Figure 2:
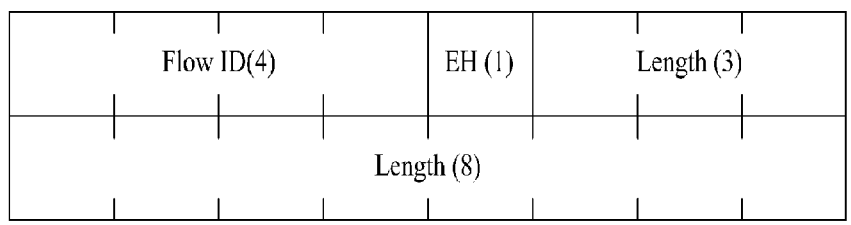
FIG. 2 shows one example of a structure of a generic MAC header (GMH) or an advanced generic MAC header (AGMH) applied to IEEE 802.16m system.

The present invention relates to a wireless access system. In the following description of embodiments of the present invention, disclosed are an efficient relay MAC PDU structure usable for data exchanges for a plurality of mobile stations between a relay station and a base station and data transmitting methods using the same.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point (AP), an advanced base station (ABS) and the like. And, 'terminal' can be replaced by such a terminology as a user equipment (UE), a mobile station (MS), a mobile subscriber station (MSS), an advanced mobile station (AMS), a subscriber station (SS) and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by the standard documents. In particular, embodiments of the present invention can be supported by at least one of P802.16-2004, P802.16e-2005, P802.16Rev2 and IEEE P802.16m documents which are the standard documents of IEEE 802.16 system.

In the following description, specific terminologies are provided to help the understanding of the present invention. And, the use of the specific terminology can be modified into another form within the scope of the technical idea of the present invention.

Relay MAC PDU Structure

As one of methods for a relay station (ARS) to efficiently relay data toward a plurality of different mobile stations (AMS) from a base station (ABS) or data toward the base station (ABS) from a plurality of the different mobile stations (AMS), a tunnel mode (or a relay mode) is described with reference to FIG. 3 as follows.

Figure 3:
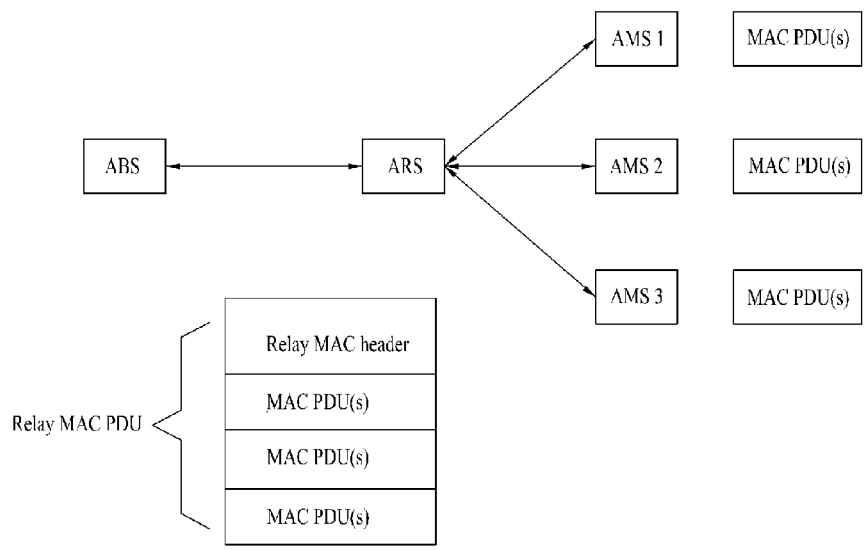
FIG. 3 shows one example o a connection state between a mobile station, a base station and a relay station, to which a tunnel mode is applicable.

FIG. 3 shows one example o a connection state between a mobile station, a base station and a relay station, to which a tunnel mode is applicable.

Referring to FIG. 3, when a relay station relays data between a base station and a plurality of mobile stations, a tunnel mode means a mode of transmitting MPDU via a tunnel formed by the relay station ARS.

The relay station ARS connected to the base station may be uniquely identified by ARS STID within a base station area. If the tunnel mode is applied, each tunnel formed between the ABS and the ARS may be identified by a different FID. In particular, each tunnel connection may be uniquely identified through a combination of the ARS STID and the FID.

At least 2 MPDUs, which are headed toward a plurality of mobile stations or transmitted from a plurality of mobile stations, may be transmitted via a relay link in a manner of being packed with a payload of a relay MAC PDU or being concatenated with the relay MAC PDU. In doing so, STID is used to identify that each of the MPDUs is to be delivered to which one of the mobile stations. To this end, STID information of the MPDU may be included in the relay MAC PDU. The relay station uses the STID information included in a downlink relay MAC PDU to create A-MAP in an access link and the base station indicates that each of the MAC PDUs belongs to which mobile station using STID information included in an uplink relay MAC PDU.

If the relay station completes a network entry into the base station, at least one tunnel may be formed. In this case, a connection to one mobile station may be mapped to at least one or more tunnels. MAC PDUs delivered via a tunnel in a tunnel mode are encapsulated with MAC PDU together with a relay MAC header containing a tunnel identifier (i.e., FID). In particular, a plurality of MAC PDUs delivered via one tunnel may be transmitted in a manner of being concatenated into one relay MAC PDU.

Yet, when a relayed MAC PDU is transmitted in a relay link, as mentioned in the foregoing description, it may be also necessary to transmit STID information for identifying a mobile station for which each MAC PDU is heading. Preferably, the STID information is transmitted in form of an extended header (EH) of a relay MAC PDU. Hence, a detailed method for this transmission, i.e., an EH structure needs to be defined.

If a length field of a relay MAC header of a relay MAC PDU transmitted in a manner of encapsulating a plurality of MAC PDUs is defined as 11 bits like a generic GMH, it may be insufficient to represent a size of a plurality of the MAC PDUs.

Moreover, the ARS should be able to identify a MAC PDU transmitted to the ARS itself and a relay MAC PDU containing MPDU from each other.

In order to solve these problems, the present invention proposes an efficient relay MAC PDU structure.

First of all, assume that a relay MAC PDU includes a relay MAC header (relay GMH) and an STID extended header (EH). In this case, the relay GMH may include a tunnel identifier (i.e., FID) for identifying a tunnel through which a corresponding relay MAC PDU is transmitted and a length field indicating a size of the corresponding relay MAC PDU. And, the STID extended header may include an STID of a mobile station to which each MPDU included in the corresponding relay MAC PDU should be transmitted.

In the following description, relay MAC PDU structures according to the present invention are explained with reference to FIGS. 4 to 11. In FIGS. 4 to 11, assume a case that a base station ABS transmits at least one MPDU to three different mobile stations AMS via a relay station ARS in common. And, assume that MPDU for each mobile station is encapsulated into one relay MAC PDU, that the relay MAC PDU includes a relay MAC header, and that the relay MAC header includes a relay GMH and an STID extended header. Moreover, a numeral in a parenthesis behind a name of each field indicates a size of a corresponding filed, i.e., a bit number. Yet, the above assumptions are just exemplary, by which the present invention may be non-limited. And, it is apparent that the present invention may be applicable a variety of situations.

Figure 4:
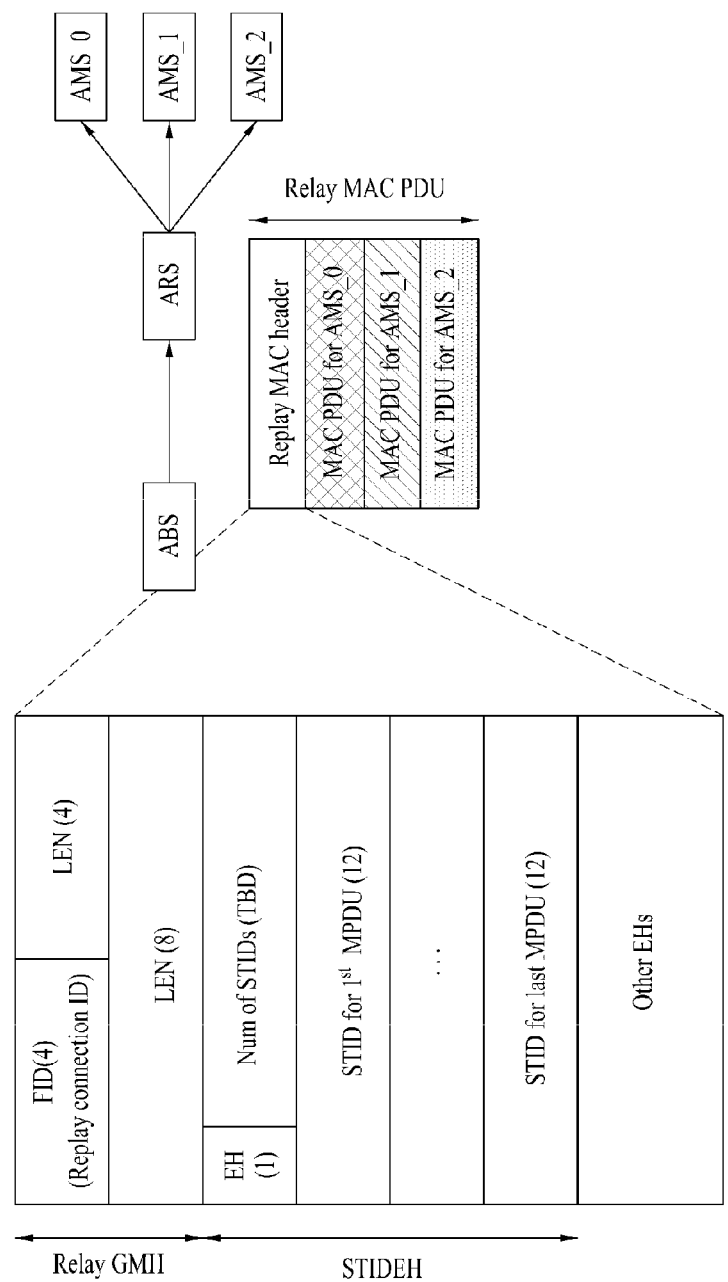
FIG. 4 shows one example of a relay MAC PDU structure according to the present invention.

FIG. 4 shows one example of a relay MAC PDU structure according to the present invention.

Referring to FIG. 4, if a value of an FID field included in a relay GMH has a value corresponding to one of tunnel indicators (i.e., FID or relay connection ID) set between an ABS and an ARS, a 12-bit length field can be set next to the FID field.

An STID extended header (EH) is always transmitted behind the relay GMH. In particular, the STID EH includes an extended header (EH) field indicating a presence or non-presence of a next transmitted EH and an STID information indicating STID of MPDU included in a relay MAC PDU. In this case, in the STID information, a STID number field (i.e., a field of a number of STIDs) and STID fields amounting to a value indicated by the STID number field) are listed.

Figure 5:
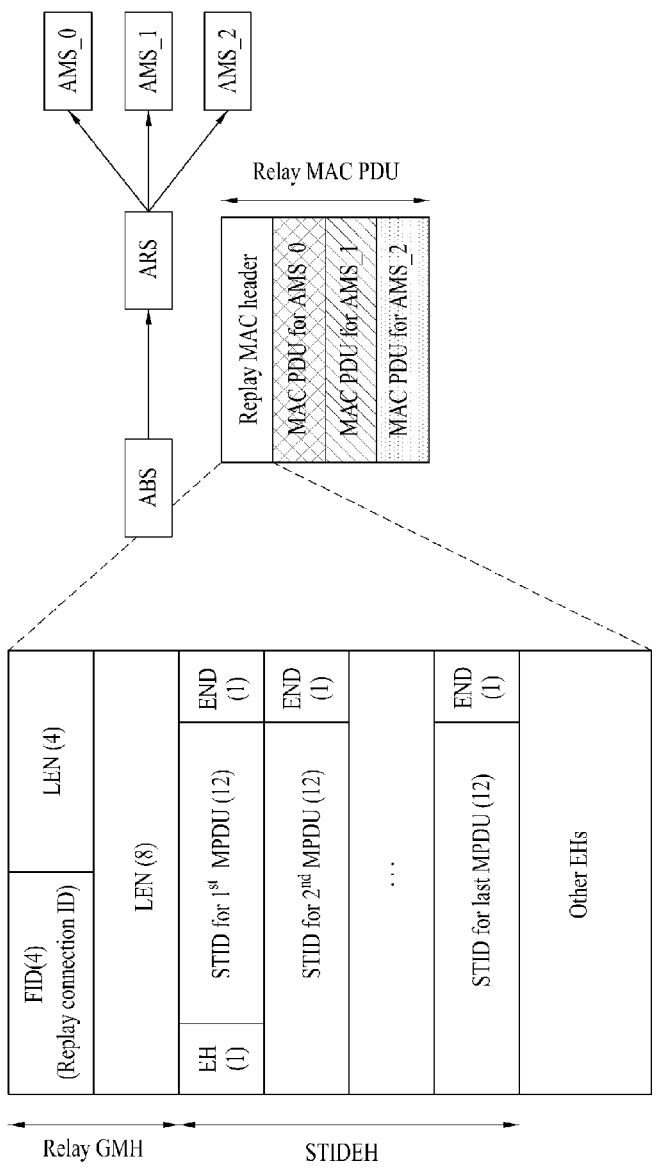
FIG. 5 shows another example of a relay MAC PDU structure according to the present invention.

FIG. 5 shows another example of a relay MAC PDU structure according to the present invention.

Referring to FIG. 5, an STID EH is always transmitted behind a relay GMH. In particular, the STID EH includes an extended header (EH) field indicating a presence or non-presence of a next transmitted EH and an STID information indicating STID of MPDU included in a relay MAC PDU. In this case, the STID information is transmitted in form of 'STID+END' field. If the END field is set to 1, it may indicate that it is not followed by another 'STID+END' field. If the END field is set to 0, it may indicate that it is followed by another 'STID+END' field.

Figure 6:
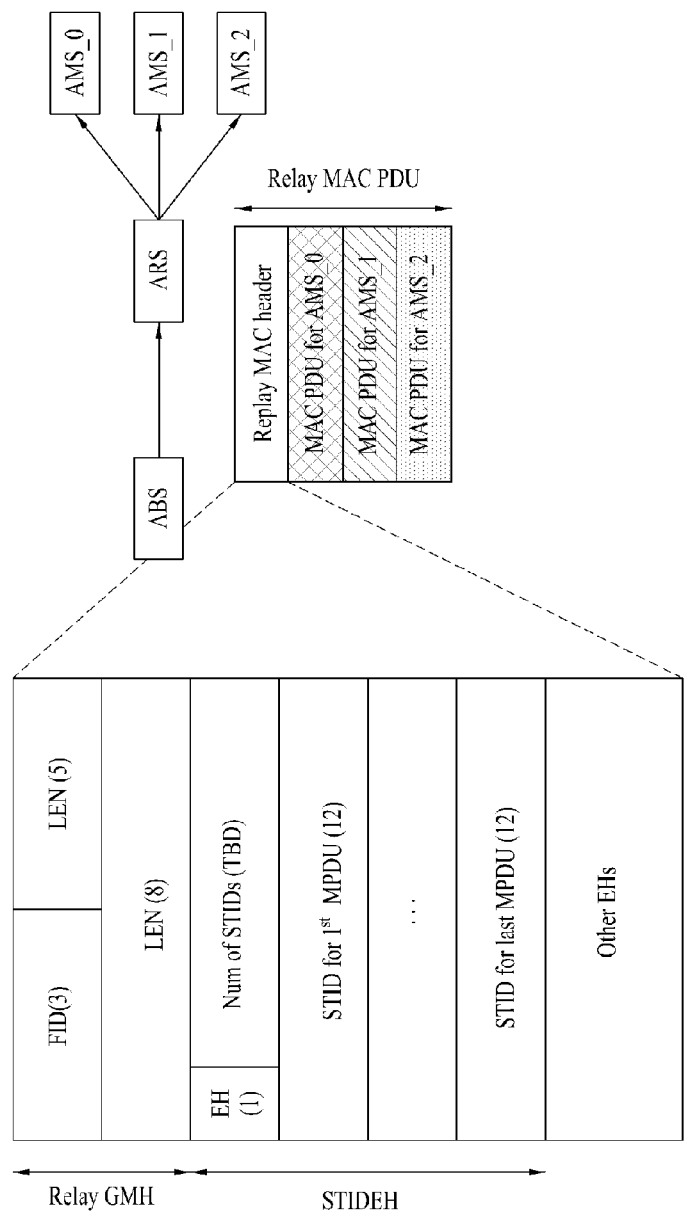
FIG. 6 shows another example of a relay MAC PDU structure according to the present invention.

FIG. 6 shows another example of a relay MAC PDU structure according to the present invention.

A relay MAC PDU structure shown in FIG. 6 is similar to the former relay MAC PDU structure shown in FIG. 4. When many MPDUs are included or a large-scale MPDU is included, the relay MAC PDU structure shown in FIG. 6 indicates a relay MAC PDU usable in case that a 12-bit length field is insufficient. In particular, in the relay MAC PDU structure shown in FIG. 6, an FID field includes 3 bits and a length field includes 13 bits. The rest of the field configuration is similar to that of the former relay MAC PDU structure shown in FIG. 4 and its redundant description will be omitted from the following description for clarity of this specification.

Figure 7:
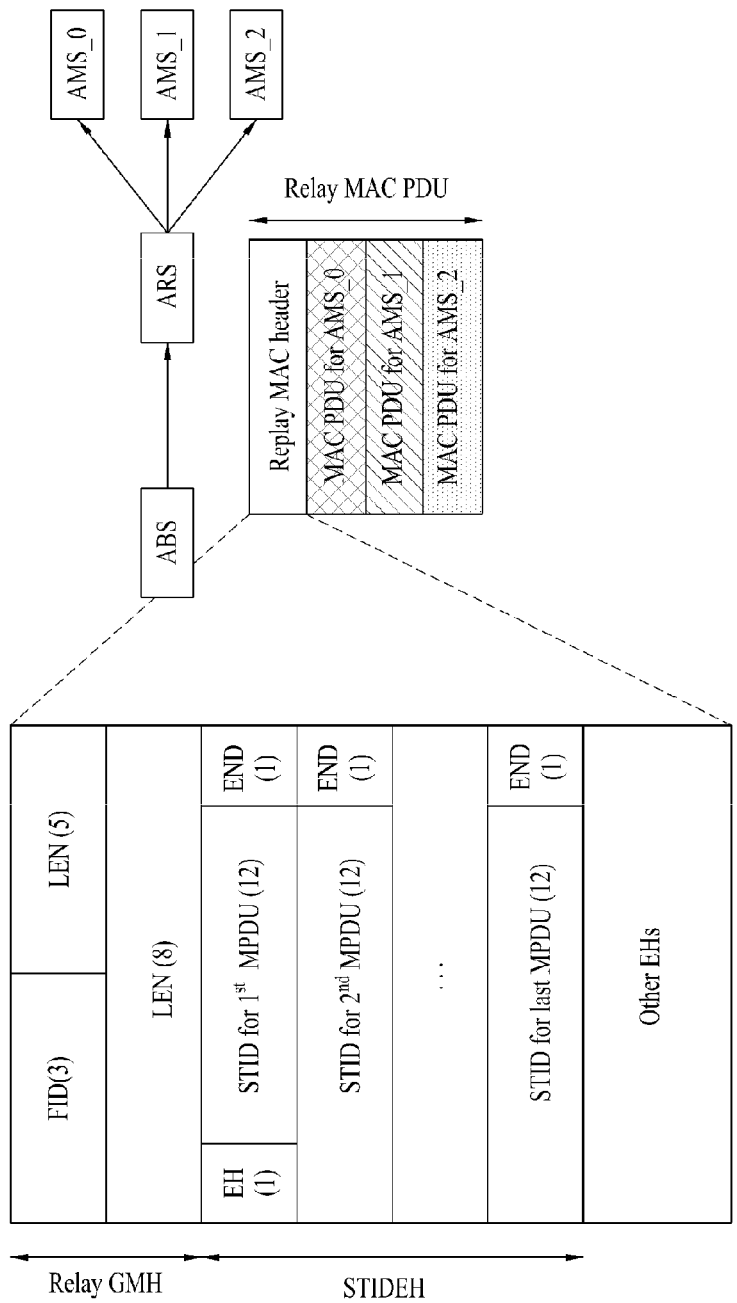
FIG. 7 shows another example of a relay MAC PDU structure according to the present invention.

FIG. 7 shows another example of a relay MAC PDU structure according to the present invention.

A relay MAC PDU structure shown in FIG. 7 is similar to the former relay MAC PDU structure shown in FIG. 5. When many MPDUs are included or a large-scale MPDU is included, the relay MAC PDU structure shown in FIG. 7 indicates a relay MAC PDU usable in case that a 12-bit length field is insufficient. In particular, in the relay MAC PDU structure shown in FIG. 7, an FID field includes 3 bits and a length field includes 13 bits. The rest of the field configuration is similar to that of the former relay MAC PDU structure (i.e., 'STID+END' field, etc.) shown in FIG. 5 and its redundant description will be omitted from the following description for clarity of this specification.

Figure 8:
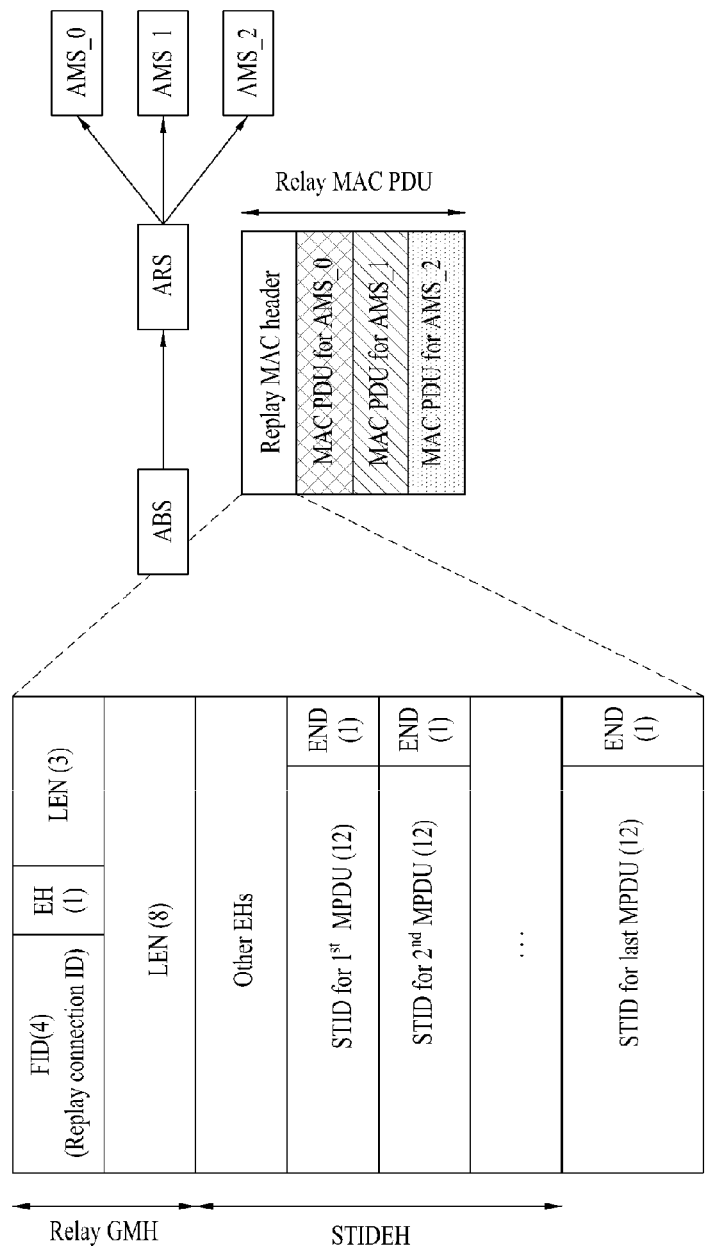
FIG. 8 shows another example of a relay MAC PDU structure according to the present invention.

FIG. 8 shows another example of a relay MAC PDU structure according to the present invention.

In a relay MAC PDU structure shown in FIG. 8, a structure of a relay GMH has the same format of GMH of a general IEEE 802.16m system. In particular, the structure of the relay GMH includes a 4-bit FID field, a 1-bit EH field and an 11-bit length field.

In this case, if a value of an FID field included in the relay GMH has one of values of tunnel indicators (i.e., FID, relay connection ID, etc.) set between an ABS and an ARS, an STID EH is always transmitted as a last EH behind the GMH. In particular, if an EH field value of the GMH is set to 0, the STID EH is transmitted right behind the GMH. If an EH field value of the GMH is set to 1, the STID EH is always transmitted behind the EH having a last field set to 1.

Moreover, STID information for indicating an STID of each MPDU transmitted in a relay MAC PDU is transmitted in form of 'STID+END' field similar to the former STID information shown in FIG. 5 or FIG. 7.

Figure 9:
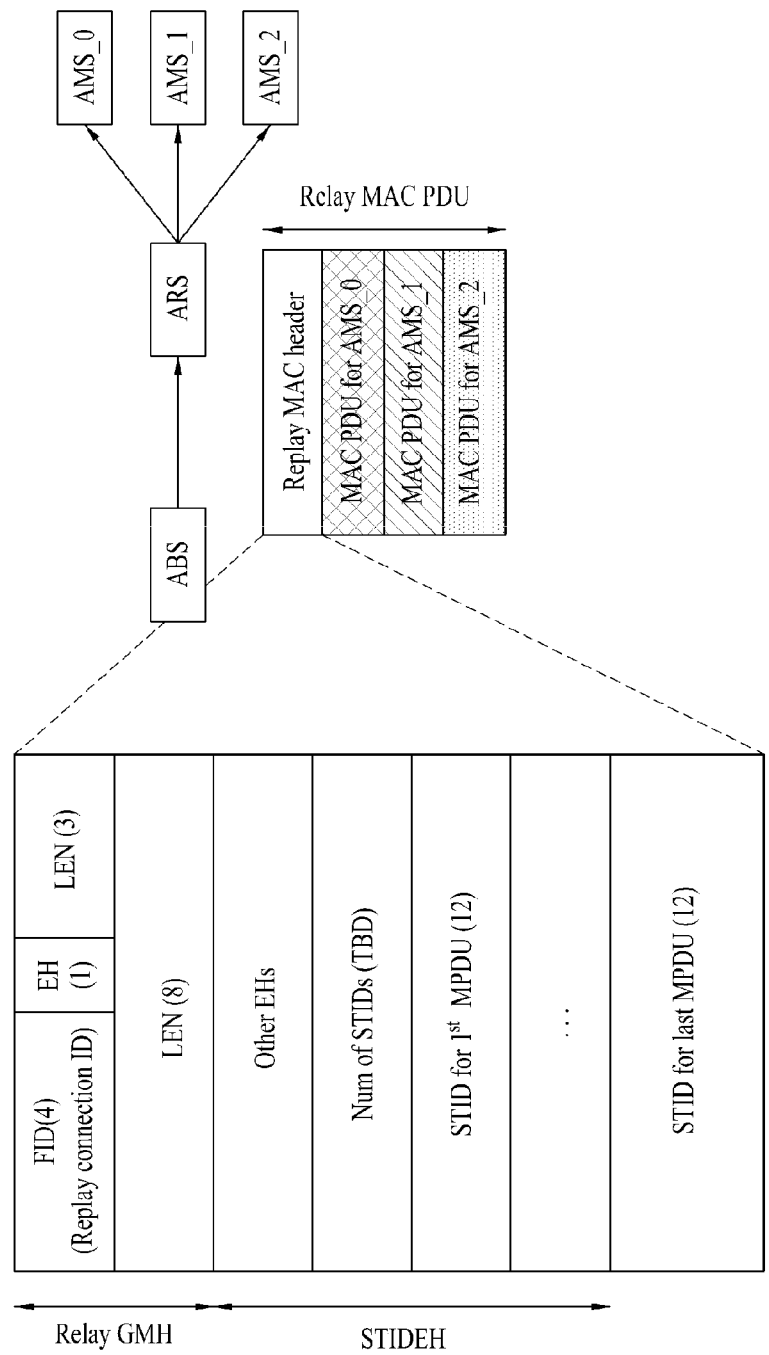
FIG. 9 shows another example of a relay MAC PDU structure according to the present invention.

FIG. 9 shows another example of a relay MAC PDU structure according to the present invention.

A relay MAC PDU structure shown in FIG. 9 is similar to the former relay MAC PDU structure shown in FIG. 8 except a format of STID information. In particular, the STID information has a format of 'STID+END' field but an STID number (number of STIDs) field and STID fields amounting to a value indicated by the STID number field are transmitted in form of a list.

Figure 10:
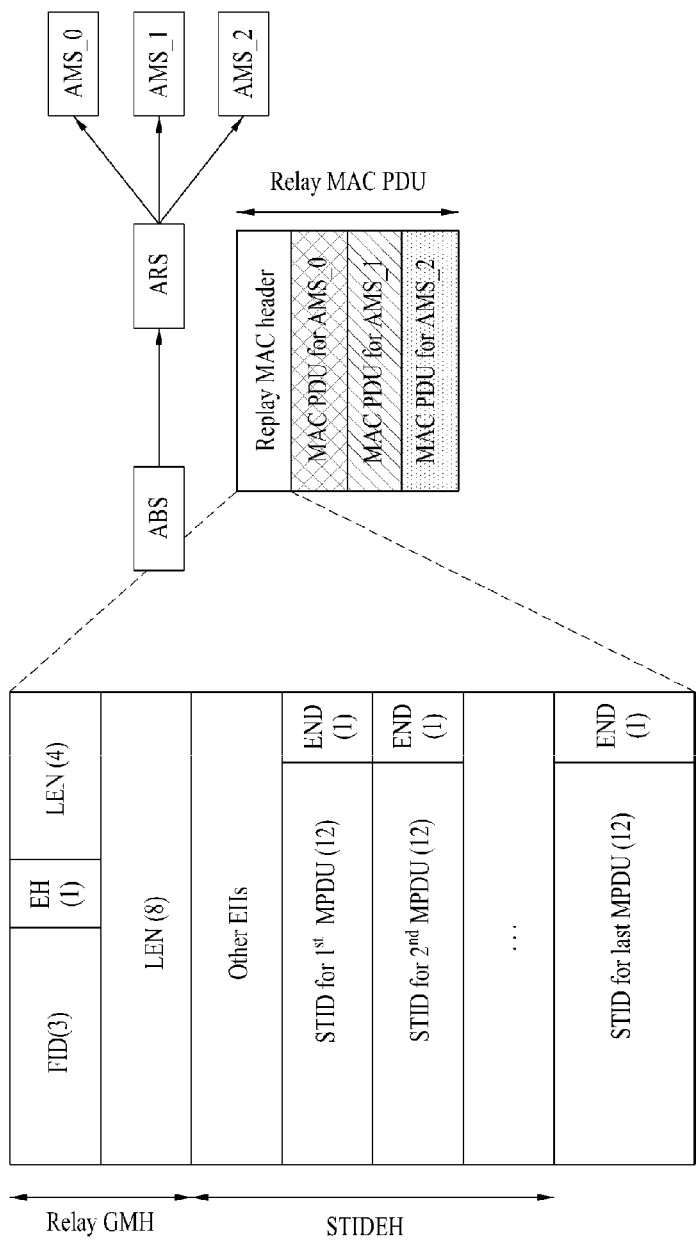
FIG. 10 shows a further example of a relay MAC PDU structure according to the present invention.

FIG. 10 shows a further example of a relay MAC PDU structure according to the present invention.

A relay MAC PDU structure shown in FIG. 10 is similar to the former relay MAC PDU structure shown in FIG. 8. When many MPDUs are included or a large-scale MPDU is included, the relay MAC PDU structure shown in FIG. 10 represents a relay MAC PDU usable in case that an 11-bit length field is insufficient. In particular, in the relay MAC PDU structure shown in FIG. 10, an FID field includes 3 bits and a length field includes 12 bits. The rest of the field configuration is similar to that of the former relay MAC PDU structure (e.g., 'STID+END' field, etc.) shown in FIG. 8 and its redundant description will be omitted from the following description for clarity of this specification.

Figure 11:
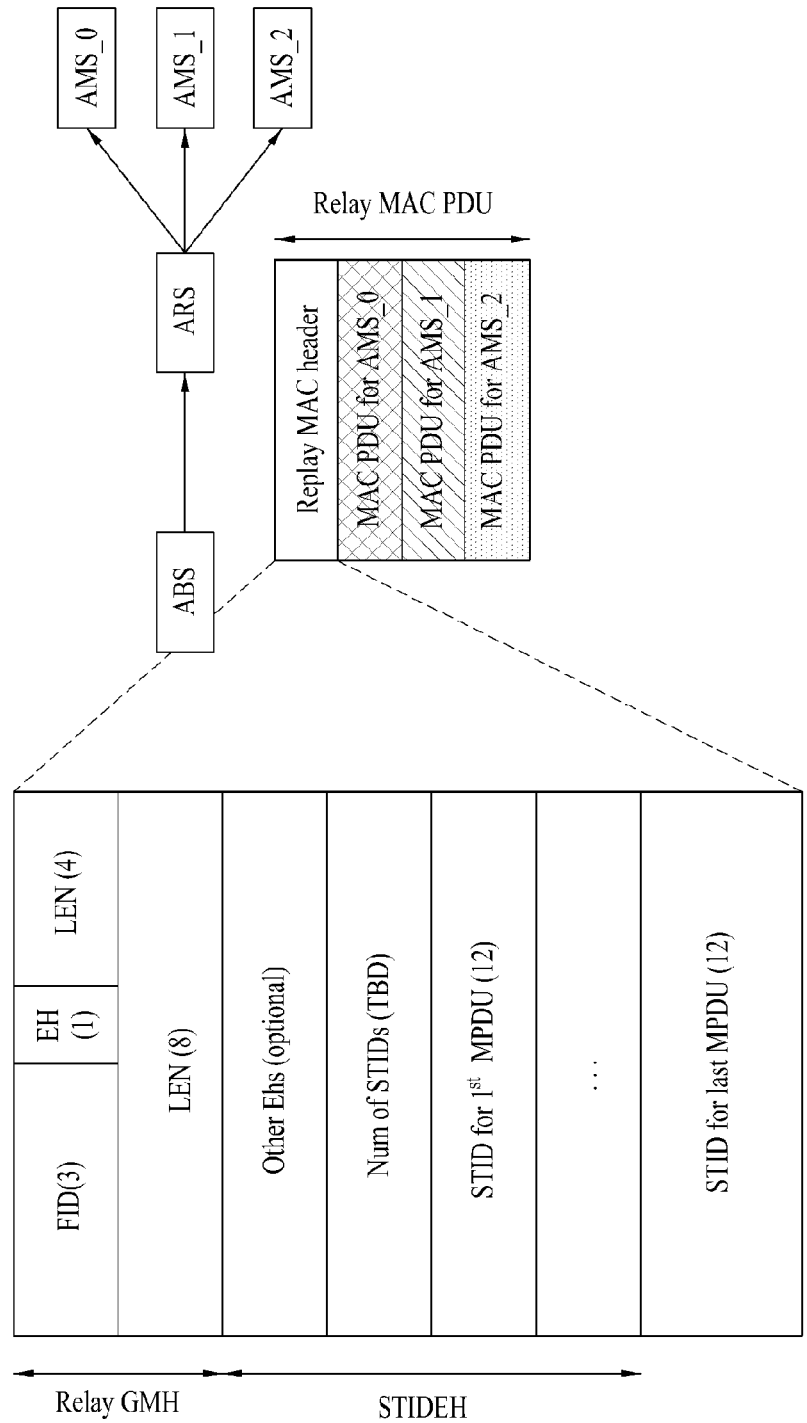
FIG. 11 shows another further example of a relay MAC PDU structure according to the present invention.

FIG. 11 shows another further example of a relay MAC PDU structure according to the present invention.

A relay MAC PDU structure shown in FIG. 11 is identical to the former relay MAC PDU structure shown in FIG. 10 except a format of STID information. In particular, the STID information has a format of 'STID+END' field but an STID number (number of STIDs) field and STID fields amounting to a value indicated by the STID number field are transmitted in form of a list.

When one of the MAC PDU structures mentioned in the foregoing description is applied, if an FID field value of a relay GMH has a value of a general control connection instead of a tunnel identifier, it may be preferable that an STID EH proposed by the present invention is not transmitted.

Moreover, when a relay MAC PDU including a relay GMH constructed with a 4-bit FID field and a 12-bit length field is transmitted, a MAC PDU for a control connection follows a GMH format (i.e., 4-bit FID field, 1-bit EH field and 11-bit length field) of a general IEEE 802.16m system. In this case, it is preferable that a corresponding MAC PDU carries a fragmentation extended header (FEH) as a last EH.

Configuration of Mobile Station And Base Station

In the following description, a mobile station, a relay station and a base station (FBS, MBS), to implement the aforementioned embodiments of the present invention, according to another embodiment of the present invention are explained.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information or data.

Meanwhile, as mentioned in the foregoing description, a relay station may be able to transmit a data packet and the like to a mobile station (AMS) or another subordinate relay station and is able to receive a data packet and the like in a UL access zone from a mobile station (AMS) or a subordinate relay station. The relay station is able to receive a data packet from a base station (ABS) in a DL relay zone and is able to transmit a data packet to the base station (ABS) in a UL relay zone. Therefore, the relay station may be able to include a transmitter and a receiver to perform these operations.

Each of the transmitter and the receiver may include a processor, a module, a part and/or a means for performing embodiments of the present invention. In particular, each of the transmitter and the receiver can include a module (means) for encrypting a message, a module for interpreting the encrypted message, an antenna for transceiving the message and the like. One example of such a transmitting stage and a receiving stage is described with reference to FIG. 12 as follows.

Figure 12:
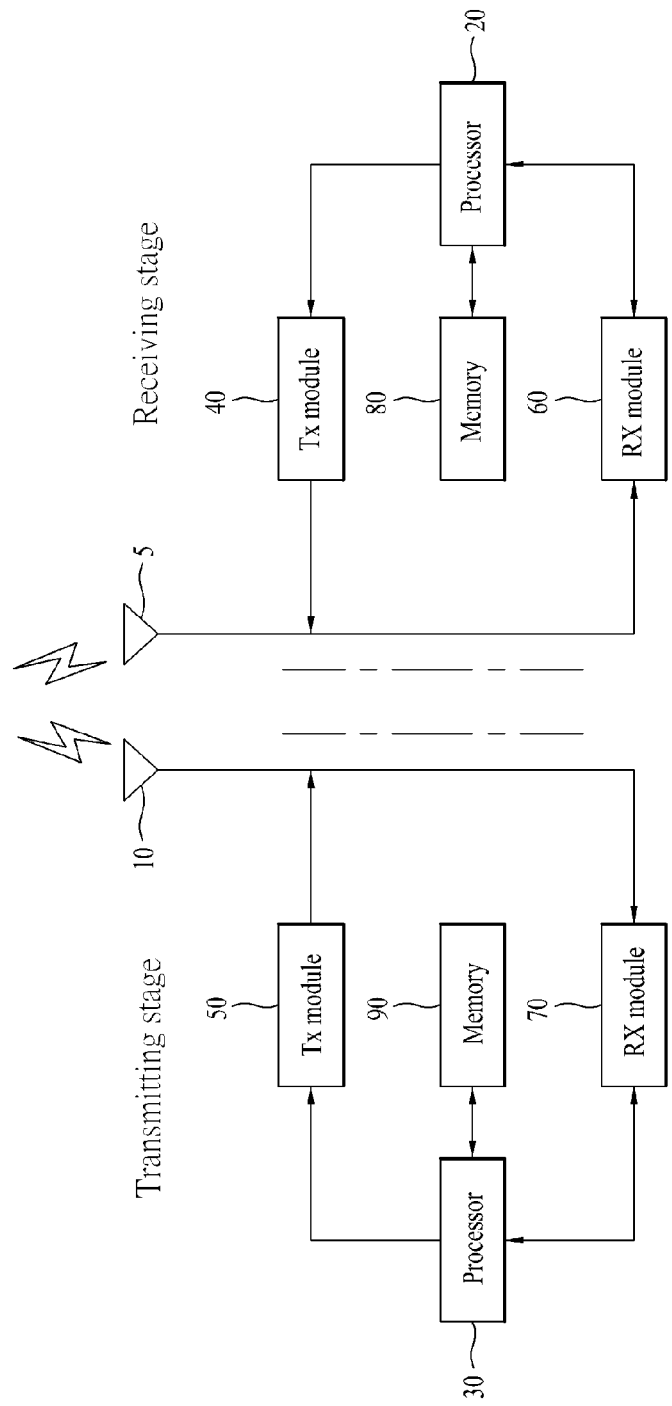
FIG. 12 is a block diagram for one example of configurations of a transmitting stage and a receiving stage according to one embodiment of the present invention.

FIG. 12 is a block diagram for one example of configurations of a transmitting stage and a receiving stage according to another embodiment of the present invention.

Referring to FIG. 12, a left part in the drawing indicates a configuration of a transmitting stage, while a right part in the drawing indicates a configuration of a receiving stage. Each of the transmitting stage and the receiving stage may include an antenna 5/10, a processor 20/30, a transmitting (Tx) module 40/50, a receiving (Rx) module 60/70 and a memory 80/90. Each of the above components may perform a corresponding function. The respective components are described in detail as follows.

The antenna 5/10 performs a function of externally transmits a signal generated from the transmitting module 40/50 or a function of receiving a radio signal from outside and then delivering the received radio signal to the receiving module 60/70. In case that a multi-antenna (MIMO) function is supported, at least two antennas can be provided.

The antenna, transmitting module and receiving module may be integrated into a radio frequency (RF) communication module.

The processor 20/30 generally controls overall operations of the transmitter/receiver. In particular, the processor 20/30 may be able to perform a control function, a MAC (medium access control) frame variable control function according to service characteristics and propagation environment, a handover function, an authentication function, an encryption function and the like to perform the above-described embodiments of the present invention.

In particular, when the processor of the transmitting stage transmits MAC PDUs, which are transmitted from a plurality of mobile stations or headed toward a plurality of the mobile station, to the receiving stage, the processor of the transmitting stage generates a relay MAC PDU by encapsulating the corresponding MAC PDUs and may be then able to transmit the generated relay MAC PDU to the receiving stage. In this case, as mentioned in the foregoing description, the relay MAC PDU may include a relay GMH and an STID EH containing STID information.

The processor of the receiving stage identifies a tunnel, on which a corresponding relay MAC PDU is transmitted, via a relay GMH of a relay MAC PDU received from the transmitting stage and may be then able to determine a length of the relay MAC PDU. The processor of the receiving stage may use STID information of an STID EH to determine that MAC PDUs included in a corresponding relay MAC PDU are transmitted/received to/from which mobile station.

Besides, the processor of the transmitting/receiving stage may be able to perform overall control operations of the operating processes disclosed in the aforementioned embodiments.

The transmitting module 40/50 performs prescribed coding and modulation on data, which is scheduled by the processor 830/840 and will be then transmitted externally, and is then able to deliver the coded and modulated data to the antenna 5/10.

The receiving module 60/70 reconstructs the radio signal received externally via the antenna 5/10 into original data in a manner of performing decoding and demodulation on the received radio signal and is then able to deliver the reconstructed original data to the processor 20/30.

The memory 80/90 may store programs for processing and control of the processor 20/30 and may be able to perform a function of temporarily storing input/output data (e.g., CRID, etc.). And, the memory 80/90 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

And, the base station may further include means, modules, parts and/or the like for performing a controller function, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like to implement the above-described embodiments of the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, a more efficient relay station data transmitting method in a broadband wireless access system and a relay/base station configuration are explained with reference to an example applied to IEEE 802.16 system. And, the present invention is applicable to various kinds of mobile communication systems including 3GPP and 3GPP2 as well as IEEE 802.xx system.

What is claimed is:

1. A method for transmitting data for a plurality of mobile stations (AMS) to a relay station (ARS) by a base station (ABS) in a wireless access system, the method comprising:
   generating an Extended Header (EH) including a plurality of STIDs (Station Identifiers) for the plurality of mobile stations; and
   transmitting a MAC PDU (medium access control protocol data unit) including the EH to the relay station,
   wherein a first STID for a first mobile station in the EH includes a first 1 bit field indicating whether a presence or non-presence of a next transmitted EH and a second 1 bit field indicating whether a second STID of a second mobile station different from the first mobile station is accompanied behind the first STID in the EH,
   wherein the second STID for the second mobile station is added into the EH without the first 1 bit field only if the second 1 bit field for the first STID is set to '0'.

2. The method of claim 1, wherein a Generic MAC Header (GMH) is directly followed by the EH in the MAC PDU if a connection identifier included in the GMH is set to a value indicating a tunnel connection established between the base station and the relay station.

3. In a relay station (ARS) of a wireless access system, a method for receiving data for a plurality of mobile stations (AMS) from a base station (ABS), the method comprising:
   receiving a MAC PDU (medium access control protocol data unit) including an Extended Header (EH) from the base station,
   wherein the EH includes a plurality of STIDs (Station Identifiers) for the plurality of mobile stations; and
   wherein a first STID for a first mobile station in the EH includes a first 1 bit field indicating whether a presence or non-presence of a next transmitted EH and a second 1 bit field indicating whether a second STID of a second mobile station different from the first mobile station is accompanied behind the first STID in the EH,
   wherein the second STID for the second mobile station is added into the EH without the first 1 bit field only if the second 1 bit field for the first STID is set to '0'.

4. The method of claim 3, wherein a Generic MAC Header (GMH) is directly followed by the EH in the MAC PDU if a connection identifier included in the GMH is set to a value indicating a tunnel connection established between the base station and the relay station.

5. A relay station (ARS) apparatus for relaying data exchanged between a base station (ABS) and a plurality of mobile stations (AMS), comprising:
   a processor; and
   a radio frequency (RF) communication module configured to transceive a radio signal externally under the control of the processor,
   wherein the processor is configured to receive a MAC PDU (medium access control protocol data unit) including an Extended Header (EH) from the base station,
   wherein the EH includes a plurality of STIDs (Station Identifiers) for the plurality of mobile stations; and
   wherein a first STID for a first mobile station in the EH includes a first 1 bit field indicating whether a presence or non-presence of a next transmitted EH and a second 1 bit field indicating whether a second STID of a second mobile station different from the first mobile station is accompanied behind the first STID in the EH,
   wherein the second STID for the second mobile station is added into the EH without the first 1 bit field only if the second 1 bit field for the first STID is set to '0'.

6. The relay station apparatus of claim 5, wherein a Generic MAC Header (GMH) is directly followed by the EH in the MAC PDU if a connection identifier included in the GMH is set to a value indicating a tunnel connection established between the base station and the relay station.

* * * * *